United States Patent
Kim et al.

(10) Patent No.: US 10,448,048 B2
(45) Date of Patent: Oct. 15, 2019

(54) METHOD OF MOTION ESTIMATION AND IMAGE PROCESSING APPARATUS USING THE SAME

(71) Applicant: Anapass Inc., Seoul (KR)

(72) Inventors: Tae Jin Kim, Seoul (KR); Daehyun Kim, Seoul (KR); Jae Hun Lee, Seoul (KR)

(73) Assignee: Anapass Inc., Seoul (KR)

( * ) Notice: Subject to any disclaimer, the term of this patent is extended or adjusted under 35 U.S.C. 154(b) by 762 days.

(21) Appl. No.: 14/540,150

(22) Filed: Nov. 13, 2014

(65) Prior Publication Data

US 2015/0131732 A1 May 14, 2015

(30) Foreign Application Priority Data

Nov. 13, 2013 (KR) ........................ 10-2013-0137460

(51) Int. Cl.
*H04N 19/57* (2014.01)
*H04N 19/513* (2014.01)

(52) U.S. Cl.
CPC ........... *H04N 19/57* (2014.11); *H04N 19/521* (2014.11)

(58) Field of Classification Search
None
See application file for complete search history.

(56) References Cited

U.S. PATENT DOCUMENTS

| | | | | |
|---|---|---|---|---|
| 2003/0053543 A1* | 3/2003 | Bhaumik | ............... | H04N 5/145 375/240.16 |
| 2005/0238101 A1* | 10/2005 | Schu | ..................... | H04N 19/56 375/240.16 |
| 2007/0009038 A1 | 1/2007 | Kim et al. | | |
| 2007/0047653 A1 | 3/2007 | Kim et al. | | |
| 2007/0064803 A1 | 3/2007 | Miao et al. | | |
| 2011/0090964 A1* | 4/2011 | Xu | ......................... | H04N 5/144 375/240.16 |
| 2012/0026346 A1* | 2/2012 | Lee | .................... | H04N 5/23222 348/208.1 |
| 2013/0003849 A1* | 1/2013 | Chien | .................... | H04N 19/13 375/240.16 |
| 2015/0117543 A1* | 4/2015 | Hong | .................... | H04N 19/56 375/240.16 |

FOREIGN PATENT DOCUMENTS

| | | |
|---|---|---|
| CN | 1452409 A | 10/2003 |
| CN | 1893658 A | 1/2007 |

(Continued)

OTHER PUBLICATIONS

Jun. 2, 2017, Chinese Office Action for related CN application No. 201410640351.9.

*Primary Examiner* — Kaitlin A Retallick
(74) *Attorney, Agent, or Firm* — IP Legal Services, LLC (57) ABSTRACT

A method of motion estimation includes obtaining motion vectors of blocks in a plurality of frames corresponding to a block to be motion estimated, determining whether the obtained motion vectors of the blocks are converged by comparing the obtained motion vectors of the blocks, calculating motion vector dispersity of adjacent blocks of the block to be motion estimated in a state in which the motion vectors are converged, and setting a size of a search range so as to correspond to the calculated motion vector dispersity of the adjacent blocks.

4 Claims, 7 Drawing Sheets

(56) References Cited

FOREIGN PATENT DOCUMENTS

| | | |
|---|---|---|
| CN | 1925617 A | 3/2007 |
| CN | 101366279 A | 2/2009 |
| CN | 102045563 A | 5/2011 |
| CN | 103260020 A | 8/2013 |
| KR | 10-0790757 B1 | 1/2008 |

\* cited by examiner

METHOD OF MOTION ESTIMATION AND IMAGE PROCESSING APPARATUS USING THE SAME

CROSS-REFERENCE TO RELATED APPLICATION

This application claims the benefit under 35 U.S.C. § 119(a) of Korean Patent Application No. 10-2013-0137460, filed on Nov. 13, 2013 in the Korean Intellectual Property Office, the entire disclosure of which is incorporated herein by reference for all purposes.

BACKGROUND

The following description relates to a method of motion estimation and an image processing apparatus using the same.

Motion estimation technology is technology that obtains a motion vector by finding movement of an object or a background using two consecutive frames of video. The motion estimation technology is one of the important technologies which are used in a variety of image processing fields such as video compression, three-dimensional (3D)-noise reduction, de-interlacing, frame rate conversion (FRC), and the like.

A variety of motion estimation technologies from full search technology to fast search technology have been developed. Video compression is used to reduce redundancy between consecutive frames, and therefore the main purpose of the video compression is to find a motion vector in which a motion compression error is minimized rather than find accurate motion information of an actual object. The main purpose of FRC is to find accurate motion information of an actual object or a background.

Motions of a moving object in a video may be classified into a case in which the object performs decelerated or accelerated motion with acceleration, or a case in which the object performs motion at constant velocity. However, even in the case in which the object performs accelerated motion, when the motion except for the beginning and the end of the motion is divided by a reasonably short time interval, the motion may be classified into motion nearly close to motion at constant velocity, and portions classified in this manner may occupy a large portion of the motion.

In an example in which an object displayed in an image performs motion at constant velocity during a total of 8 frames from frame 0 to frame 7, motion estimation of a frame unit is performed a total of seven times in the frames 0 and 1, frames 1 and 2, frames 2 and 3, frames 3 and 4, frames 4 and 5, frames 5 and 6, and frames 6 and 7. When using the result of motion estimation of a previous frame and the result of local motion estimation prior to a corresponding frame while performing motion estimation of a frame unit, the reliability of motion estimation may be improved. In particular, in a case in which an object uniformly performs motion at constant velocity without acceleration or deceleration, the motion vector obtained over several frames may be the same as the motion vector of an actual object or have only a small difference therebetween, and therefore it is possible to obtain the result that the estimated motion vector is converged onto the motion vector of the actual object.

SUMMARY

However, in the conventional technology, in a case of performing local motion estimation, local motion estimation is performed while maintaining the area of a search range uniform even when an object performs motion at constant velocity or performs accelerated or decelerated motion. Thus, when an error occurs due to image characteristics such as noise, a brightness change, and the like which are interposed between any two frames and due to characteristics of a motion estimation algorithm, it may be estimated that a corresponding block or object within the search range moves to a position to which the corresponding block or object does not actually move, whereby an error may occur when performing motion estimation. In order to avoid such an error, when the area of the search range is always set to be small and motion estimation is performed, it cannot follow the actual motion at accelerated and decelerated motion intervals, so that the result of the motion estimation is completely wrong or the time required to be converged onto the actual motion is increased. As a result, there is a disadvantage that errors may occur in the result of motion estimation during several frames until being converged onto the actual motion.

In one general aspect, there is provided a method of motion estimation including: obtaining at least two motion vectors of a block between frames in a plurality of frames; determining whether the at least two motion vectors of the block are converged; calculating dispersity of motion vectors of adjacent blocks of the block whose the at least two motion vectors are determined to be converged; and setting a size of a search range of the block based on the calculated dispersity of the motion vectors of the adjacent blocks.

In another general aspect, there is provided an image processing apparatus including: a motion vector calculation unit that obtains at least two motion vectors of a block between frames in a plurality of frames; a convergence determination unit that determines whether the at least two motion vectors of the block are converged; a dispersity calculation unit that calculates dispersity of motion vectors of adjacent blocks of the block whose the at least two motion vectors are determined to be converged; and a search range size setting unit that sets a size of a search range of the block based on the calculated dispersity of motion vectors of the adjacent blocks.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

All terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
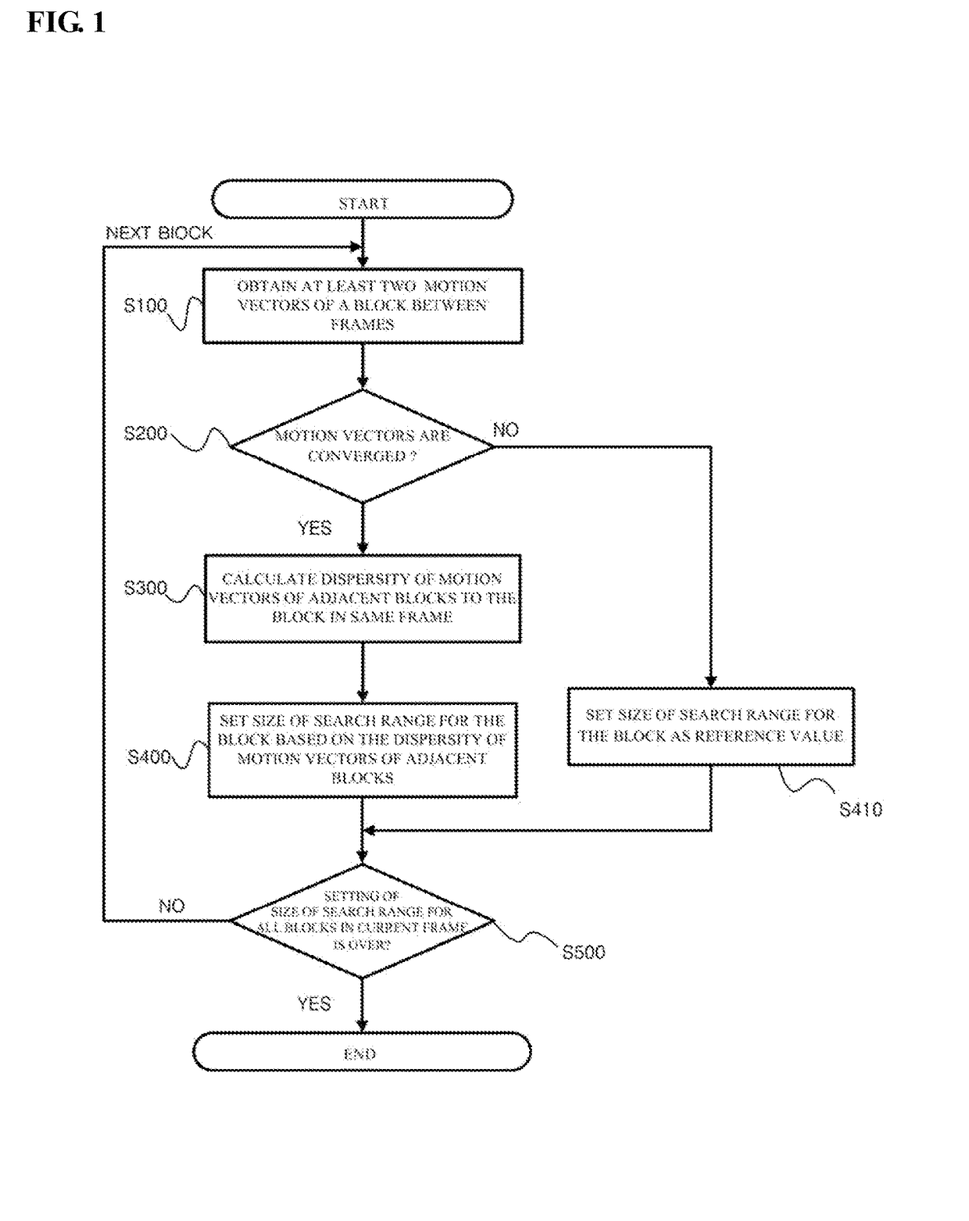
FIG. 1 is a flowchart illustrating an example of a method of motion estimation.

FIG. 1 is a flowchart illustrating an example of a method of motion estimation.

Referring to FIG. 1, in operation S100 (step 100), at least two motion vectors of a block between frames in a plurality of frames are obtained. The motion vectors are obtained from first block in first frame and second block which corresponds to the first block in second frame in time axis. The two frames (first frame and second frame) could be consecutive. Further the two frames could comprise of one frame and k-th previous frame to the one frame, wherein the k is two or more.

A size of search range could be determined through the obtaining at least two motion vectors (S100) and the setting size of search range (S400 or S410). The determined size of search range is for only one block in a frame.

As a size of search range for one block is determined, the obtaining at least two motion vectors (S100) for another block will begin. And all procedure in FIG. 1 will be end after a size of search range for all block in current frame are determined (S500). And the procedure in FIG. 1 could be performed in next frame to the current frame.

According to an embodiment in which the motion vectors of the block in the plurality of frames are defined and calculated, motion vectors of co-located blocks which are located in the same position in two frames temporally separated are calculated. According to another embodiment, the motion vectors of the block in the plurality of frames are defined as motion vectors of blocks corresponding to a projected motion vector, which are obtained in such a manner that a motion vector of a predetermined block in any one frame is projected to another frame according to the magnitude and direction of the motion vector. The motion vectors of the block calculated in this manner are stored in a memory.

According to an embodiment, motion vectors of block in frames prior to at least two frames from the current frame are obtained. As an example, when the current frame is $I_t$, motion vectors of the block in two adjacent frames $I_{t-1}$ and $I_{t-2}$ prior to the current frame are obtained. As another example, motion vectors of the block in any two frames $I_{t-j}$ and $I_{t-m}$ prior to the current frame are obtained.

Next, in operation S200, whether the obtained motion vectors of the block are converged could be determined by comparing one motion vector to another motion vector or other motion vectors of the block.

Figure 2:
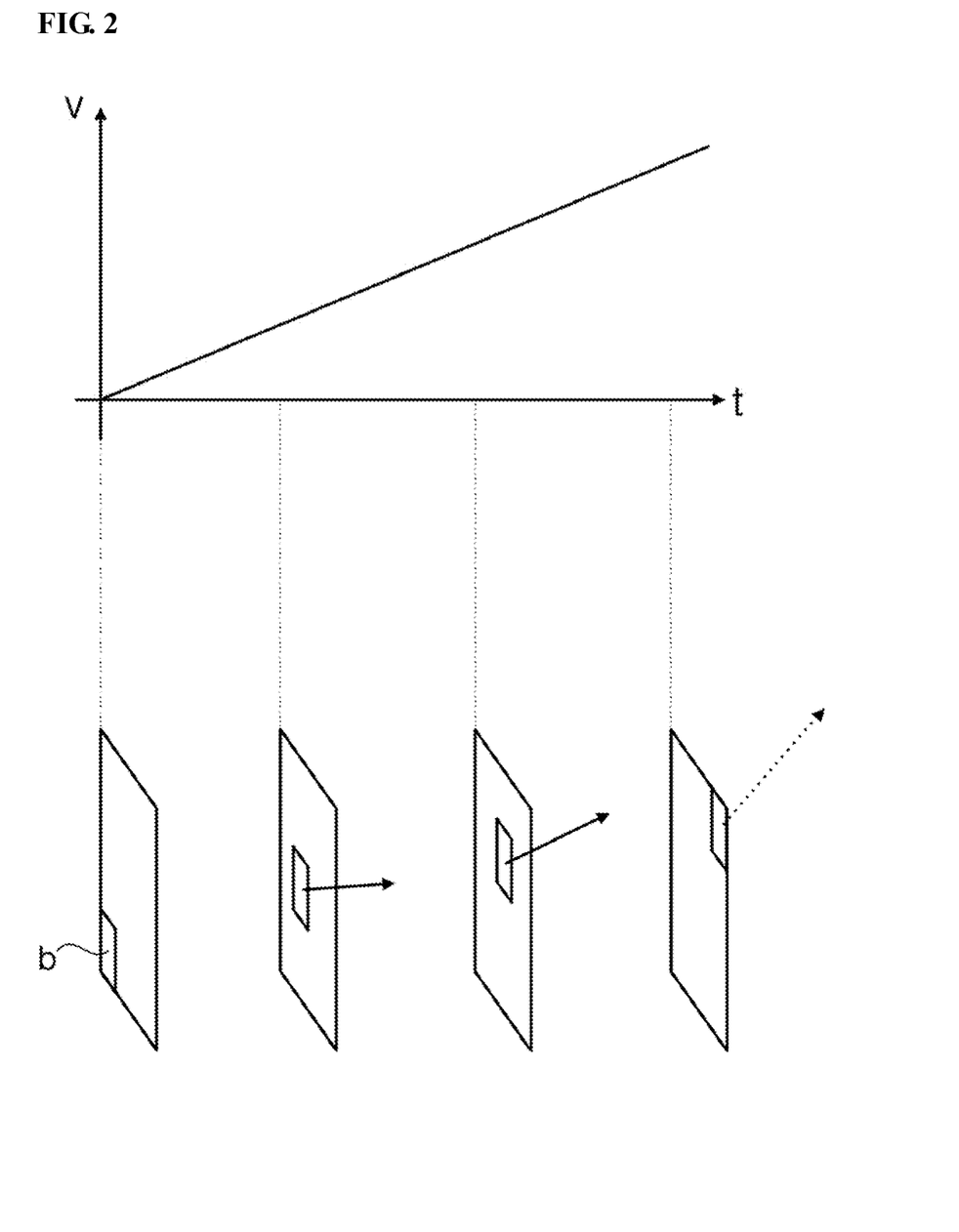
FIG. 2 schematically illustrates an example of a speed of a block and a position of a block in each frame.
Figure 3:
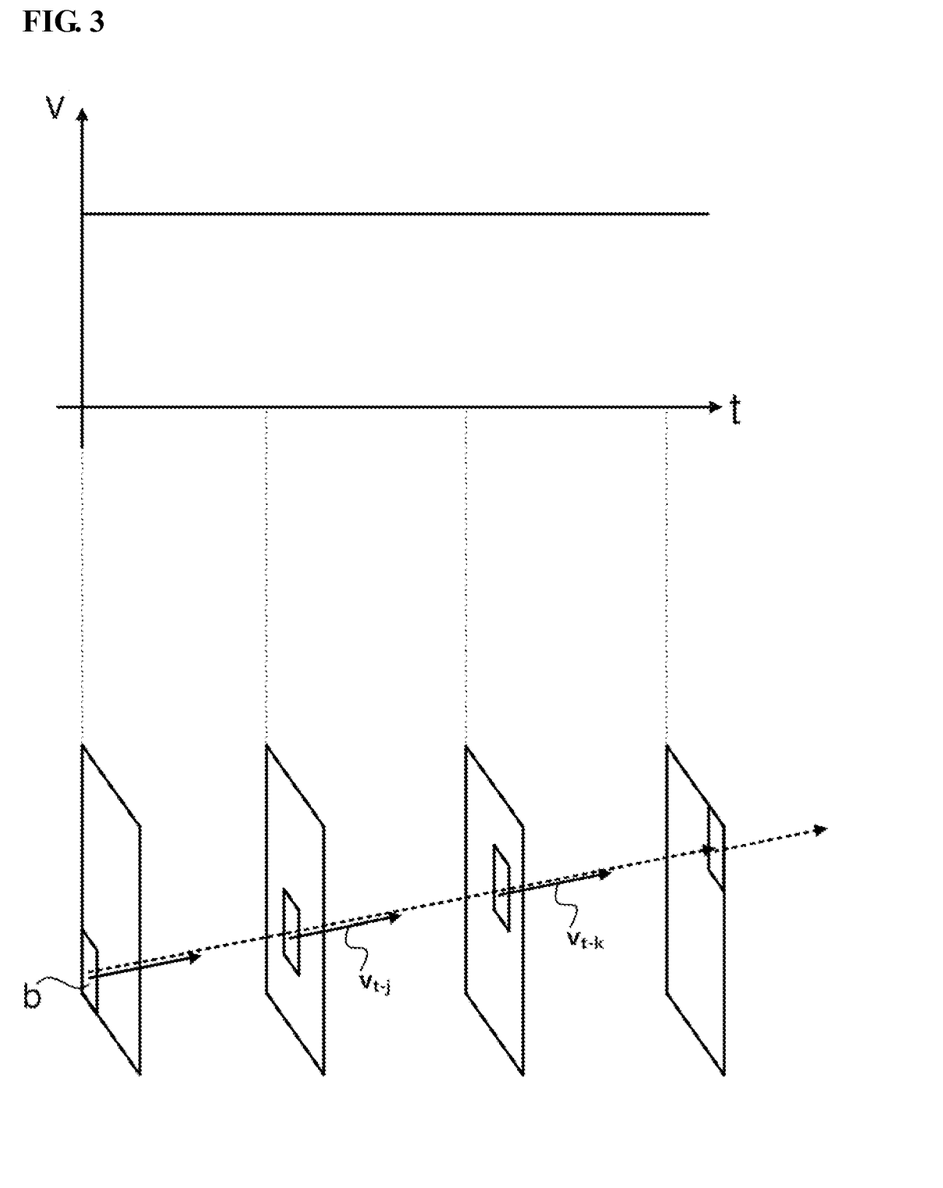
FIG. 3 schematically illustrates another example of a speed of a block and a position of a block in each frame.

FIGS. 2 and 3 schematically illustrate an example of a speed of a block and a position of a block in each frame. In an upper portion of FIG. 2, a speed of a block b is schematically illustrated, and in a lower portion of FIG. 2, motion of the block b is schematically illustrated. Referring to FIG. 2, the block b in a stationary state moves over time and the speed of the block b is gradually increased by acceleration. The motion vector indicates the direction in which the block moves and a magnitude of the motion of the block, is calculated using a position difference of blocks in two adjacent frames, and indicates the direction in which the block moves and the speed of the motion of the block. Thus, as shown in FIG. 2, in a case in which the block performs accelerated motion, the motion vector of the block for each frame is different.

FIG. 3 schematically illustrates an example of a speed of a block that moves at constant velocity, a position of the block in a frame, and a motion vector of the block in each frame. Referring to FIG. 3, a motion vector $v_{t-j}$ of a block that is calculated by performing motion estimation between any two adjacent frames and a motion vector $v_{t-k}$ of a block that is calculated by performing motion estimation in two other adjacent frames may be the same, or a difference therebetween is smaller compared to the case of FIG. 2. In this manner, when a difference of several numbers of motion vectors calculated through a plurality of frames is smaller than a predetermined threshold value, it can be said that the motion vector is converged.

According to an embodiment of comparing the motion vectors of the block, when a motion vector in a frame t−k is $V(x, y, t-k) = (V_{x, t-k}, V_{y, t-k})$ and a motion vector in a frame t is $V(x, y, t) = (V_{x, t}, V_{y, t})$, the motion vectors of the block may be compared by calculating an absolute value for a difference of elements on any one axis of each vector and an absolute value for a difference of elements on another axis. That is, the motion vectors of the blocks may be compared by calculating the following Equation 1.

$$\Delta V = |V_{x,t-k} - V_{x,t}| + |V_{y,t-k} - V_{y,t}| \quad \text{[Equation 1]}$$

According to another embodiment of comparing the motion vectors of the block, the motion vectors of the block may be compared by calculating a magnitude of a difference of two vectors. That is, the motion vectors of the block may be compared by calculating the following Equation 2.

$$\Delta V = \sqrt{(V_{x,t-k} - V_{x,t})^2 + (V_{y,t-k} - V_{y,t})^2} \quad \text{[Equation 2]}$$

According to another embodiment of comparing the motion vectors of the block, the motion vectors of the block may be compared by calculating a magnitude ratio of two vectors. In this instance, whether the motion vectors are converged may be determined by comparing the calculated magnitude ratio of the two vectors and the threshold value.

According to an embodiment of determining whether the motion vectors are converged, when a current frame is indicated as $I_t$ and a frame, a k-th frame prior to the current frame, is indicated as $I_{t-k}$, motion vectors of blocks in a frame $I_{t-2}$, the second frame prior to the current frame, and a frame $I_{t-1}$ immediately prior to the current frame are compared to determine whether the motion vectors are converged. In addition, according to another embodiment, using motion vectors of block in at least any two adjacent frames from the frame $I_{t-k}$, the k-th frame prior to the current frame, to the frame $I_{t-4}$ immediately prior to the current frame, may determine whether the motion vectors are converged.

When a threshold value that determines whether the motion vectors of the block are converged is "0", only a state in which the block moves at completely constant velocity may be detected, and when the threshold value is sets as a value larger than "0", a state in which the block performs accelerated motion with a large acceleration as well as the state in which the block moves at constant velocity may be detected. According to an embodiment of setting the threshold value, the threshold value may be set as a constant value regardless of the magnitude of the motion vector. According to another embodiment of setting the threshold value, the threshold value may be set as a value that is varies according to the magnitude of the motion vector.

Figure 4:
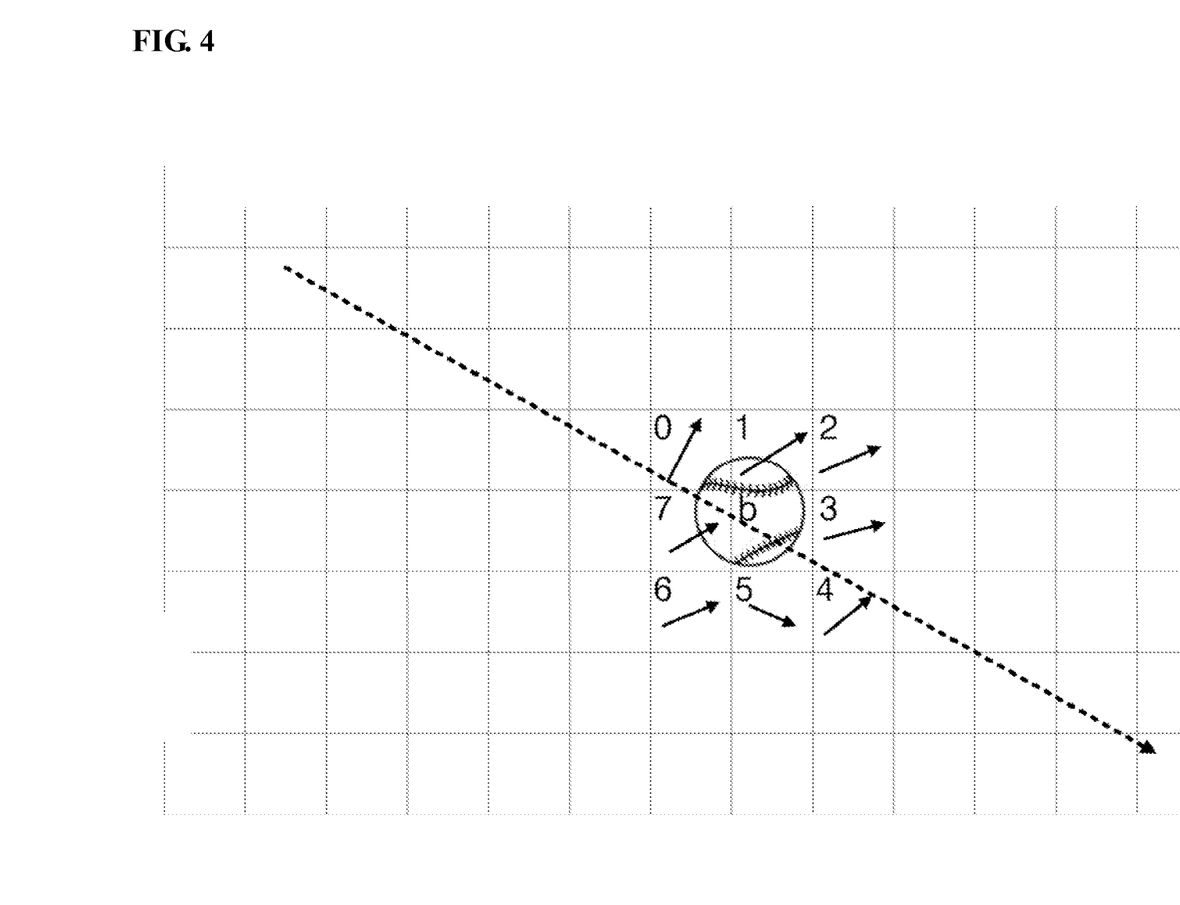
FIG. 4 illustrates an example of a motion vector of adjacent blocks (block 0 to block 7) of a moving block b.

In operation S300, dispersity of motion vectors of adjacent blocks of the block to be motion estimated is calculated in a state in which the motion vectors are converged. FIG. 4 illustrates an example of a motion vector of adjacent blocks (block 0 to block 7) of a moving block b. When the block b moves at constant velocity as an object indicated as a baseball moves and the motion vector of the block b is converged, dispersity of motion vectors of the adjacent blocks of the block b is calculated. As an example, the dispersity of the motion vectors may be obtained by calculating deviation, variance, and standard deviation of the motion vector of each block using any one of an arithmetic mean value, a geometric mean value, a weighted average value, a weighted sum, a sum of the motion vectors of the adjacent blocks of the block b.

According to an embodiment, when performing motion estimation in a raster scan method, there may be a case in which the motion vectors of the adjacent blocks cannot be obtained during the period of motion estimation. In the case of the adjacent blocks whose motion vectors cannot be obtained, as an example, dispersity of motion vectors is obtained using motion vectors of co-located blocks located in the same position in two frames which are temporally separated. As another example, a motion vector of a corresponding block in the previous frame is projected to another frame according to the magnitude and direction of the motion vector, and dispersity of motion vectors may be obtained using motion vectors of blocks corresponding to the projected motion vector. As still another example, the dispersity of motion vectors is calculated while ignoring the motion vectors of the adjacent blocks that fail to obtain the motion vectors.

Figure 5A:
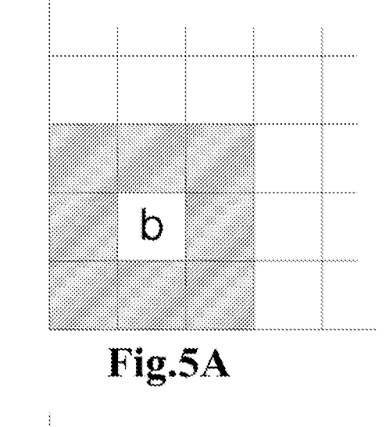
FIGS. 5A-5F illustrate examples of a block b to be motion estimated and adjacent blocks which are different from one another.
Figure 5B:
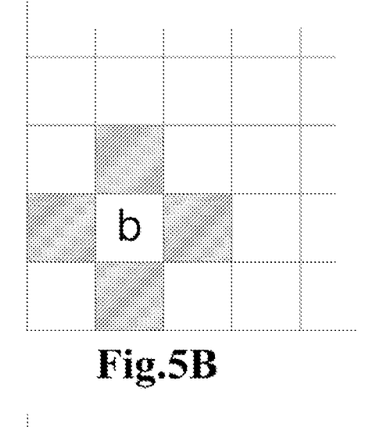
Figure 5C:
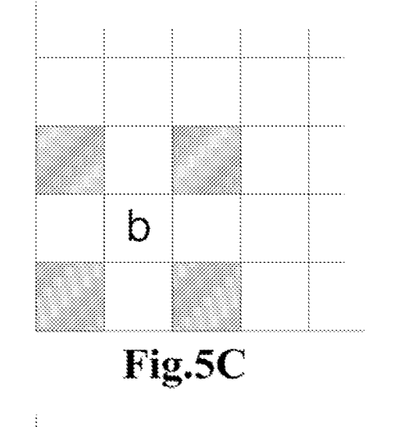
Figure 5D:
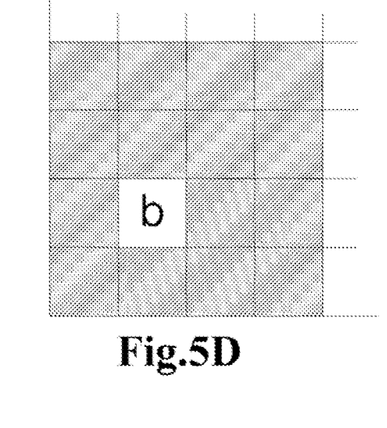
Figure 5E:
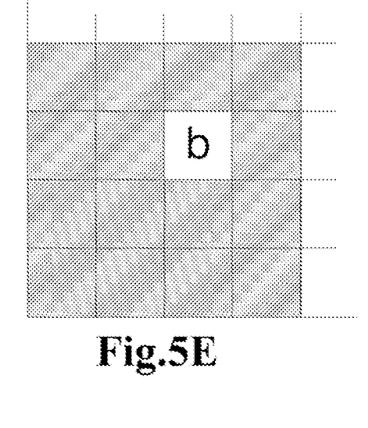
Figure 5F:
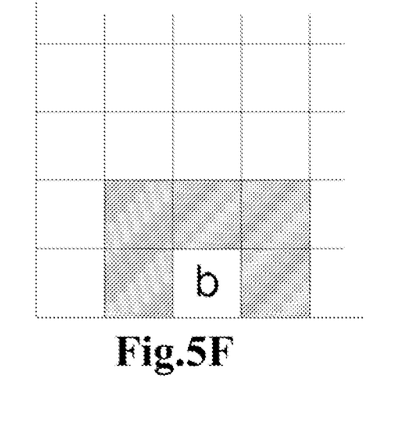

FIGS. 5A-5F illustrate example of a block b to be motion estimated and adjacent blocks which are different from one another. The block to be motion estimated is indicated as b inside the corresponding block, and the adjacent blocks are indicated by slashes. The adjacent blocks may be set as blocks that surround the block b in 3×3 blocks including the block b as shown in FIG. 5a, set as blocks vertically and horizontally adjacent to the block b as shown in FIG. 5b, and set as blocks diagonally adjacent to the block b as shown in FIG. 5c. In addition, the adjacent blocks may be set as blocks that surround the block b in 4×4 blocks including the block b as shown in FIGS. 5d and 5e, and set as blocks which surround the block b together with one edge of the frame as shown in FIG. 5f. However, as FIGS. 5a to 5f illustrate just an example of setting of the adjacent blocks of the block b to be motion estimated. For example, the adjacent blocks may be set in many methods other than the illustrated methods such as a method of setting the adjacent blocks as blocks that surround the block b located at the center in 5×5 blocks.

In operation S400, a size of a search range is set so as to correspond to the calculated dispersity of motion vectors of the adjacent blocks. As the dispersity is lower due to the uniform motion vectors of the adjacent blocks, the motion vector obtained is designed such that the actual movement of the block to be motion estimated is highly likely to be close to the motion vectors of the adjacent blocks. Thus, the size of the search range is set so as to correspond to the dispersity of motion vectors of the adjacent blocks when performing motion estimation. That is, motion estimation is performed in such a manner that the area of the search range is set larger as the dispersity of motion vectors of the adjacent blocks is larger and is set smaller as the dispersity of motion vectors thereof is smaller.

However, at time intervals during which the block does not move at constant velocity such as time intervals during which the block starts to move and completes its motion, the motion vectors are not converged. In this manner, in the case in which the motion vectors are not converged, the size of the search range is set as a reference value (default) in operation S410 to perform motion estimation. As an example, the basic size of the search range may be set to be larger than or the same as the size of the search range in a state in which the motion vectors are converged.

Figure 6:
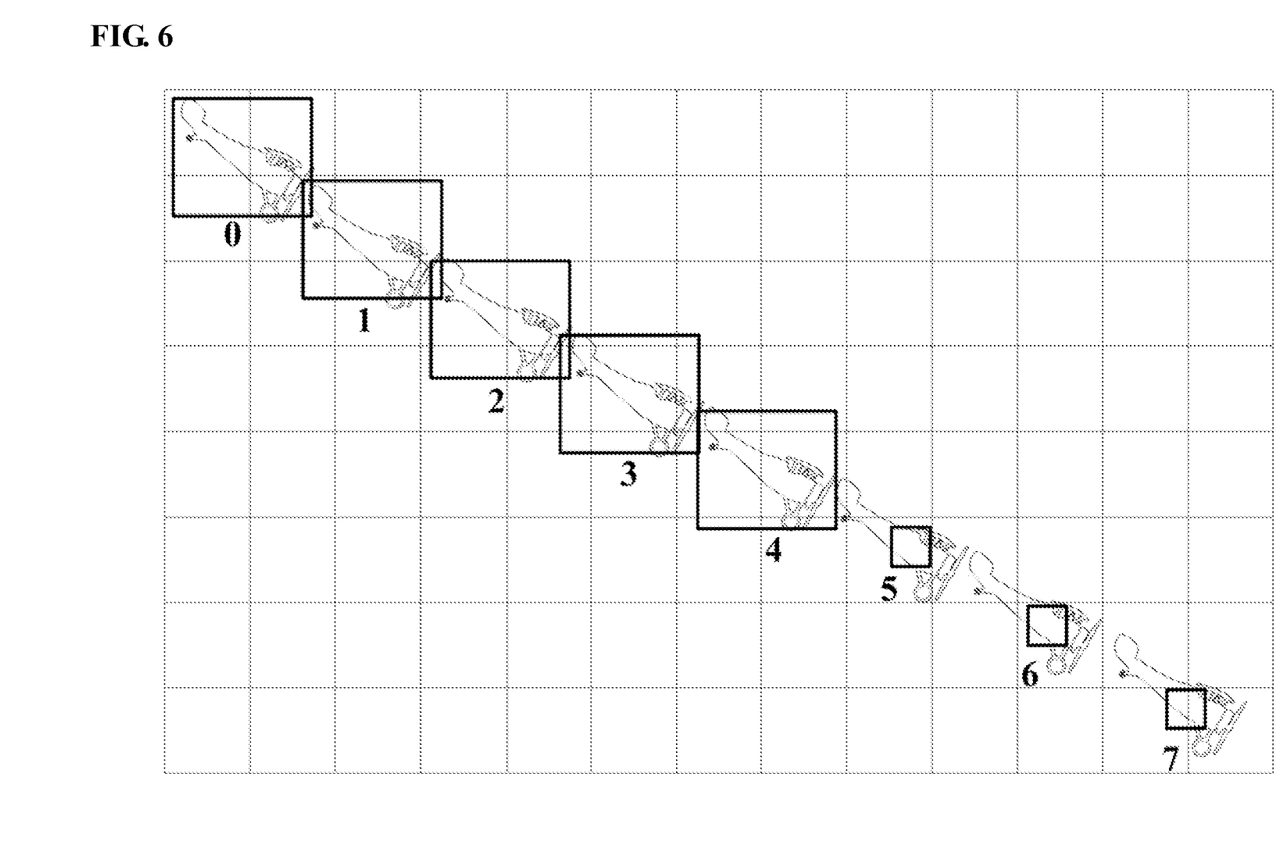
FIG. 6 illustrates an example of setting an area of a search range while an object advances from a frame 0 to a frame 7.

FIG. 6 illustrates an example of setting an area of a search range while an object advances from a frame 0 to a frame 7. The number of the frame is displayed at the bottom of a plane that is an object, and the object moves to the right lower end side while the frame number increases. There are many cases in which the motion of the object or block cannot be actually found during only one frame when the motion of the block is large. In FIG. 6 illustrating these cases, the search range is set to be large from the frame 0 to the frame 4. However, it is determined that the motion vector calculated in the previous frame is converged after the frame 5, and therefore the dispersity of motion vectors of the adjacent blocks is calculated, and the area of the search range on which local motion estimation is performed is set so as to correspond to the dispersity. Through the above-described process, the area of the search range set in the frames 5 to 7 is set to be smaller than the area of the search range set in the frames 0 to 4, and an occurrence of an error in motion estimation may be prevented by the search range set in this manner, thereby preventing destruction of the convergence state. Thus, it is possible to perform more robust motion estimation resistant to factors such as noise, a brightness change of a screen, and the like.

Figure 7:
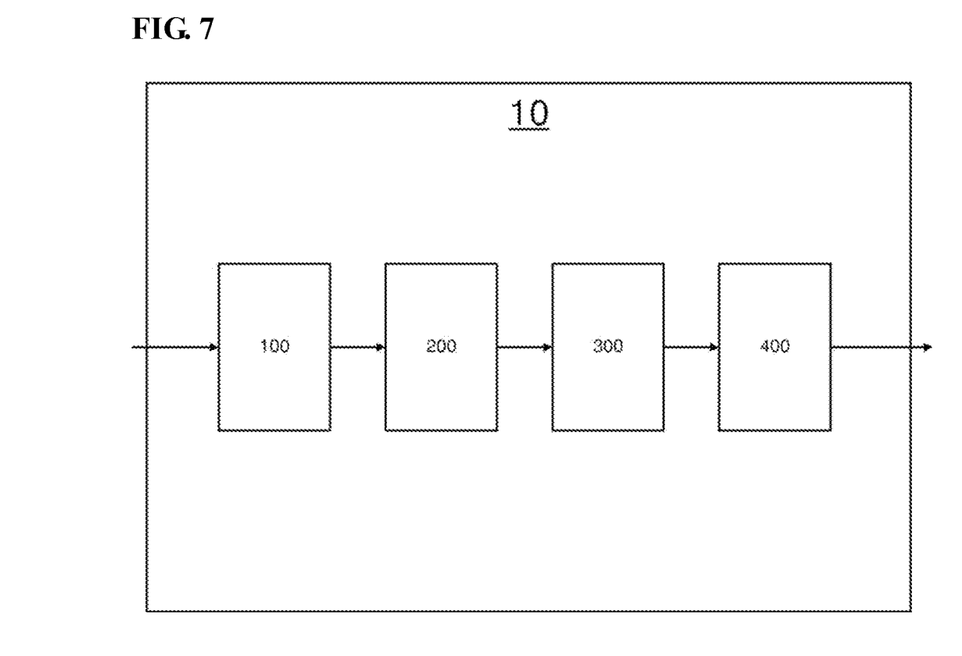
FIG. 7 is a schematic block diagram illustrating an example of an image processing apparatus.

Hereinafter, an image processing apparatus according to an example will be described. However, the repeated descriptions with the above-described embodiments may be omitted for clarity of description. FIG. 7 is a schematic block diagram illustrating an example of an image processing apparatus 10. The image processing apparatus according to an example includes a motion vector calculation unit 100 that obtains at least two motion vectors of block between frames in a plurality of frames, a convergence determination unit 200 that determines whether the obtained at least two motion vectors of the block are converged, a dispersity calculation unit 300 that calculates dispersity of motion vectors of the adjacent blocks of the block whose the at least two motion vectors are determined to be converged and a search range size setting unit 400 that sets a size of a search range for the block based on the calculated dispersity of motion vectors of the adjacent blocks.

Referring to FIG. 7, the motion vector calculation unit 100 obtains motion vectors of block in a plurality of frames. According to an embodiment of defining and calculating at least two motion vectors in the plurality of frames, motion vectors of co-located blocks located in the same position in two frames which are temporally separated are used. According to another embodiment, the motion vectors of the block in the plurality of frames are defined as motion vectors of blocks corresponding to a projected motion vector, which are obtained in such a manner that a motion vector of a predetermined block in any one frame is projected to another frame according to the magnitude and direction of the motion vector. The motion vectors of the block calculated in this manner are stored in a memory.

According to an embodiment, motion vectors of block in frames, at least two frames prior to the current frame, are obtained. As an example, when the current frame is $I_t$, motion vectors of block in two adjacent frames $I_{t-1}$ and $I_{t-2}$ prior to the current frame are obtained. As another example, motion vectors of blocks in any two frames $I_{t-j}$ and $I_{t-m}$ prior to the current frame are obtained.

As an example, the memory that stores the calculated motion vectors of the block may be included in the motion vector calculation unit 100. As another example, the memory may be included in the image processing apparatus 10, and as still another example, the memory may be included in the outside of the image processing apparatus 10.

The convergence determination unit 200 compares motion vectors in the previous frames of the block to determine whether the motion vectors are converged. That is, as described above, the motion vectors of the block may be compared by calculating an absolute value for a difference of elements on any one axis of each vector and an absolute value for a difference of elements on another axis in motion vectors of at least two frames which are temporally separated, or by calculating a magnitude of a difference of any two vectors.

The convergence determination unit 200 determines that the motion vector is converged when a difference of several motion vectors calculated in a plurality of previous frames is smaller than a predetermined threshold value, may detect only a state in which the block moves at completely constant velocity when the threshold value is "0" as described above, and detect a state in which the block performs accelerated motion with a large acceleration as well as the state in which the block moves at constant velocity. As an example, the threshold value may be set as a constant value regardless of the magnitude of the motion vector. As another example, the threshold value may be set as a value that is varies according to the magnitude of the motion vector.

The dispersity calculation unit 300 calculates dispersity of the motion vectors of the adjacent blocks. As an example of calculating the dispersity, the dispersity of the motion vectors may be obtained by calculating deviation, variance, and standard deviation of the motion vector of each block using any one of an arithmetic mean value, a geometric mean value, a weighted average value, a weighted sum, a sum of the motion vectors of the adjacent blocks of the block b. In addition, the adjacent blocks whose motion vectors are calculated have been described in FIGS. 5a to 5f. However, FIGS. 5a to 5f are just an example of setting of the adjacent blocks of the block b to be motion estimated. For example, the adjacent blocks may be set in many methods other than the illustrated methods such as a method of setting the adjacent blocks as blocks that surround the block b located at the center in 5×5 blocks.

The search range size setting unit 400 sets a size of a search range so as to correspond to the calculated dispersity of motion vectors of the adjacent blocks. As the dispersity is lower due to the uniform motion vectors of the adjacent blocks, the motion vector obtained is designed such that the actual movement of the block to be motion estimated is highly likely to be close to the motion vectors of the adjacent blocks, and therefore the size of the search range in motion estimation is set so as to correspond to the dispersity of motion vectors of the adjacent blocks. That is, motion estimation is performed in such a manner that the area of the search range is set larger as the dispersity of motion vectors of the adjacent blocks is larger and is set smaller as the dispersity of motion vectors thereof is smaller.

As described above, even in the case in which the block performs accelerated motion or decelerated motion as well as the case in which the block actually moves at constant velocity, the block may move at constant velocity during a short time interval. Thus, most of the motions of the object displayed on the image may be modeled as motion at constant velocity. When the same search range is formed regardless of whether the motion vectors of the blocks are converged at the time of performing motion estimation, there may be a case in which it is estimated that the block moves to another area included in the search range independent of the block to be motion estimated due to effects of noise interposed between frames, a brightness change between frames, non-planar image characteristics, regularly displayed patterns, and the like.

However, according to the example, when it is determined that a motion vector of an object that reliably moves at constant velocity is converged, an area of a local motion estimation area may be dynamically set according to dispersity of the motion vectors of the adjacent blocks, thereby preventing an error from occurring due to the effect of noise, brightness change, image characteristics and patterns, or the like when performing motion estimation. As a result, an effect of improving image quality may be provided. In addition, the area on which a search is performed when performing local motion estimation is reduced, thereby reducing resources used in motion estimation, and reducing a calculation time consumed for motion estimation.

As described above, according to the example, the size of the search range is set so as to correspond to a dispersity of the adjacent motion vector field in a state in which the motion vector obtained by performing motion estimation on the moving block is converged onto the actual motion vector. Thus, it is possible to exclude a possibility to select a wrong motion vector due to an error in motion estimation. In addition, once the reliable state is obtained, it is possible to reliably maintain the motion vector field while the motion is continuously maintained.

In addition, in the case in which a speed of an object that moves at constant velocity is accelerated or decelerated so that the object performs accelerated motion, the size of the search range may be set as the reference value. That is, the size of the search range may be adaptively set. Thus, the reliability of motion estimation may be improved.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of motion estimation, comprising:
   obtaining a first motion vector of an object block in a first frame and a second motion vector of the object block in a second frame, wherein the first frame denotes a frame t-k and the second frame denotes a frame t in a plurality of frames where the k is one or more;
   determining whether the first and second motion vectors are converged;
   calculating dispersity of motion vectors of adjacent blocks adjacent to the object block when the first and second motion vectors are determined to be converged, wherein the calculating dispersity of the motion vectors includes:
   obtaining any one of a sum, a weighted sum, an arithmetic mean value, a geometric mean value, and a weighted average value of the motion vectors of the adjacent blocks, and
   obtaining any one of deviation, variance, and standard deviation using any one of the sum, the weighted sum, the arithmetic mean value, the geometric mean value, and the weighted average value of the motion vectors of the adjacent blocks, and
   setting a size of a search range of the object block based on the calculated dispersity of the motion vectors of the adjacent blocks;
   setting the size of the search range with a reference value when the first and second motion vectors are not converged,
   wherein the determining whether the first and second motion vectors are converged includes:
   calculating $\Delta V = |V_{x,t-k} - V_{x,t}| + |V_{y,t-k} - V_{y,t}|$, where the $V_{x,t-k}$ and $V_{y,t-k}$ and denote x and y components of the first motion vector, and the $V_{x,t}$ and $V_{y,t}$ denote x and y components of the second motion vector; and
   determining that the first and second motion vectors are converged if the calculated $\Delta V$ is equal to or less than a threshold value.

2. The method of motion estimation of claim 1, wherein the threshold value varies according to a magnitude of the first and second motion vectors.

3. An image processing apparatus comprising:
   a motion vector calculation unit that obtains a first motion vector of an object block in a first frame and a second motion vector of the object block, wherein the first frame denotes a frame t-k and the second frame denotes a frame t in a plurality of frames where the k is one or more;
   a convergence determination unit that determines whether the first and second motion vectors are converged;
   a dispersity calculation unit that calculates dispersity of motion vectors of adjacent blocks adjacent to the object block if the first and second motion vectors are determined to be converged as a result of determination by the convergence determination unit, wherein the dispersity calculation unit further configured to:
   obtain any one of a sum, a weighted sum, an arithmetic mean value, a geometric mean value, and a weighted average value of the motion vectors of the adjacent blocks, and
   obtain any one of deviation, variance, and standard deviation using any one of the sum, the weighted sum, the arithmetic mean value, the geometric mean value, and the weighted average value of the motion vectors of the adjacent blocks; and
   a search range size setting unit configured to:
   set a size of a search range of the object block based on the calculated dispersity of motion vectors of the adjacent blocks if the first and second motion vectors are determined to be converged,
   set the size of the search range of the object block with a reference value when the first and second motion vectors are not converged,
   wherein the convergence determination unit determines that the first and second motion vectors are converged if calculated $\Delta V$ is equal to or less than a threshold,
   wherein the $\Delta V$ is calculated by the following equation, $$\Delta V = |V_{x,t-k} - V_{x,t}| + |V_{y,t-k} - V_{y,t}|,$$

where the $V_{x,t-k}$ and $V_{y,t-k}$ denote x and y components of the first motion vector, and the $V_{x,t}$ and $V_{y,t}$ denote x and y components of the second motion vector.

4. The image processing apparatus of claim 3, wherein the threshold value varies according to a magnitude of the first and second motion vectors.

* * * * *

UNITED STATES PATENT AND TRADEMARK OFFICE
CERTIFICATE OF CORRECTION

PATENT NO. : 10,448,048 B2  
APPLICATION NO. : 14/540150  
DATED : October 15, 2019  
INVENTOR(S) : Tae Jin Kim et al.

Page 1 of 1

It is certified that error appears in the above-identified patent and that said Letters Patent is hereby corrected as shown below:

In the Claims

Claim 1, Column 9, Line 19, replace "a frame tin" with --a frame t in--.

Signed and Sealed this  
Twenty-fourth Day of December, 2019

Andrei Iancu  
*Director of the United States Patent and Trademark Office*